United States Patent
Baron

(10) Patent No.: US 8,941,691 B2
(45) Date of Patent: Jan. 27, 2015

(54) MULTI-LAYERED DISPLAYS

(75) Inventor: James Baron, Auckland (NZ)

(73) Assignee: Pure Depth Limited, Auckland (NZ)

( * ) Notice: Subject to any disclaimer, the term of this patent is extended or adjusted under 35 U.S.C. 154(b) by 681 days.

(21) Appl. No.: 13/061,130

(22) PCT Filed: Aug. 26, 2009

(86) PCT No.: PCT/IB2009/006645
§ 371 (c)(1),
(2), (4) Date: Jul. 29, 2011

(87) PCT Pub. No.: WO2010/023537
PCT Pub. Date: Mar. 4, 2010

(65) Prior Publication Data
US 2011/0310121 A1    Dec. 22, 2011

(51) Int. Cl.
G09G 5/00         (2006.01)
G09G 3/00         (2006.01)
H04N 13/04        (2006.01)
G02F 1/1347       (2006.01)

(52) U.S. Cl.
CPC ............ *G09G 5/00* (2013.01); *G09G 2300/023* (2013.01); *G09G 3/003* (2013.01); *H04N 13/0495* (2013.01); *G02F 1/1347* (2013.01)
USPC ................................ 345/634; 345/636; 345/6

(58) Field of Classification Search
USPC ................................................. 345/629, 634
See application file for complete search history.

(56) References Cited

U.S. PATENT DOCUMENTS

| | | | |
|---|---|---|---|
| 5,022,085 A | 6/1991 | Cok | |
| 5,745,197 A * | 4/1998 | Leung et al. | 349/77 |
| 6,195,104 B1 * | 2/2001 | Lyons | 345/473 |
| 6,369,830 B1 * | 4/2002 | Brunner et al. | 345/629 |
| 6,507,413 B1 * | 1/2003 | Mueller et al. | 358/1.9 |
| 6,906,762 B1 * | 6/2005 | Witehira et al. | 349/73 |
| 7,193,631 B2 | 3/2007 | Mueller et al. | |
| 7,746,356 B2 * | 6/2010 | Meinders | 345/629 |
| 8,416,149 B2 * | 4/2013 | Evanicky | 345/4 |
| 8,432,411 B2 * | 4/2013 | Bell et al. | 345/589 |
| 8,436,873 B2 * | 5/2013 | Gao | 345/634 |
| 2002/0126396 A1 * | 9/2002 | Dolgoff | 359/743 |
| 2003/0080923 A1 * | 5/2003 | Suyama et al. | 345/6 |
| 2003/0122844 A1 * | 7/2003 | Mueller et al. | 345/589 |
| 2006/0191177 A1 * | 8/2006 | Engel | 40/453 |
| 2009/0305782 A1 * | 12/2009 | Oberg et al. | 463/31 |
| 2010/0277439 A1 * | 11/2010 | Charlier et al. | 345/176 |

FOREIGN PATENT DOCUMENTS

| | | |
|---|---|---|
| WO | 9944095 | 9/1999 |
| WO | 2007040413 A1 | 4/2007 |

* cited by examiner

*Primary Examiner* — M Good Johnson

(57) ABSTRACT

A method, system, computer software and display for generating and displaying a target image (14) on a multi-layered display (1). The target image (14) includes a graphical object (9) displayed on a first display layer (2) of the multi-layered display (1) and contextual elements (10) displayed on a second display layer (3). The graphical object (9) is provided with a peripheral boundary region (12) composed of contextual elements (10) displayed on the second display layer (3). A projection of the peripheral boundary region (12) on the first display layer (2) demarcates a silhouette (11) on the second display layer (3).

21 Claims, 7 Drawing Sheets

Figure 1
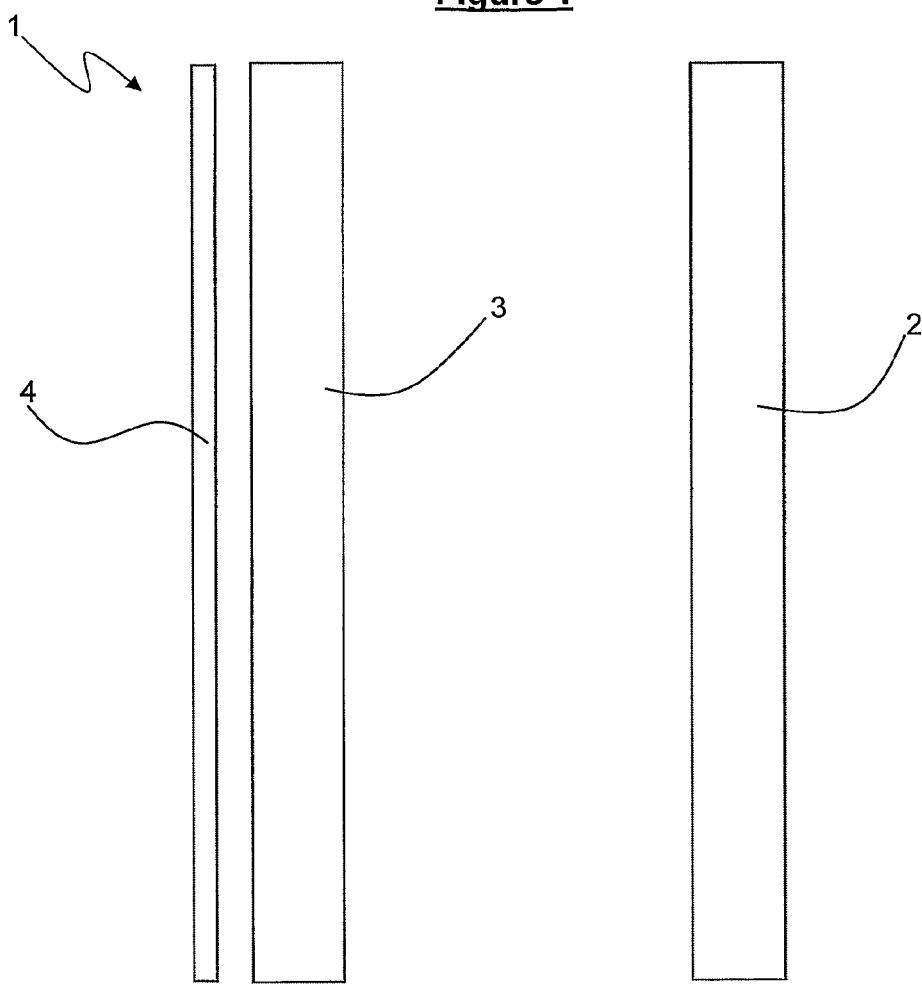
Fig 1a
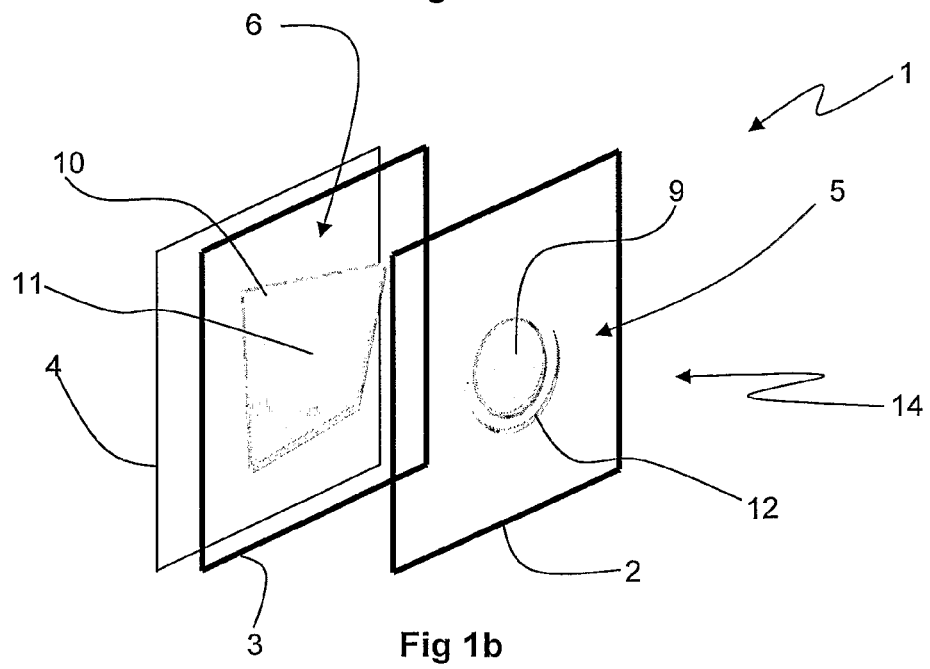
Fig 1b

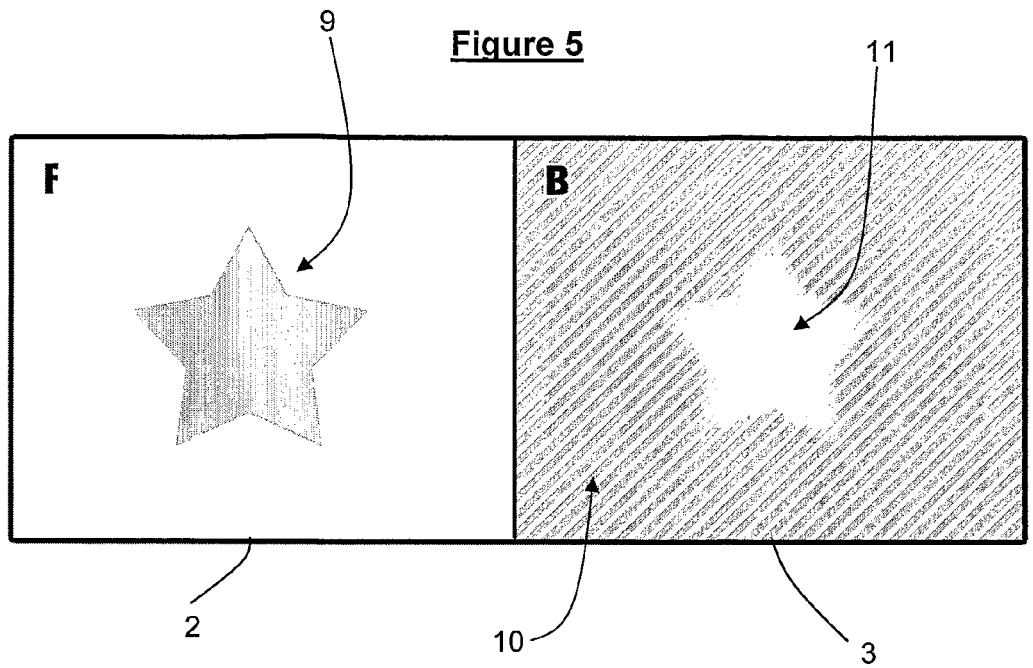
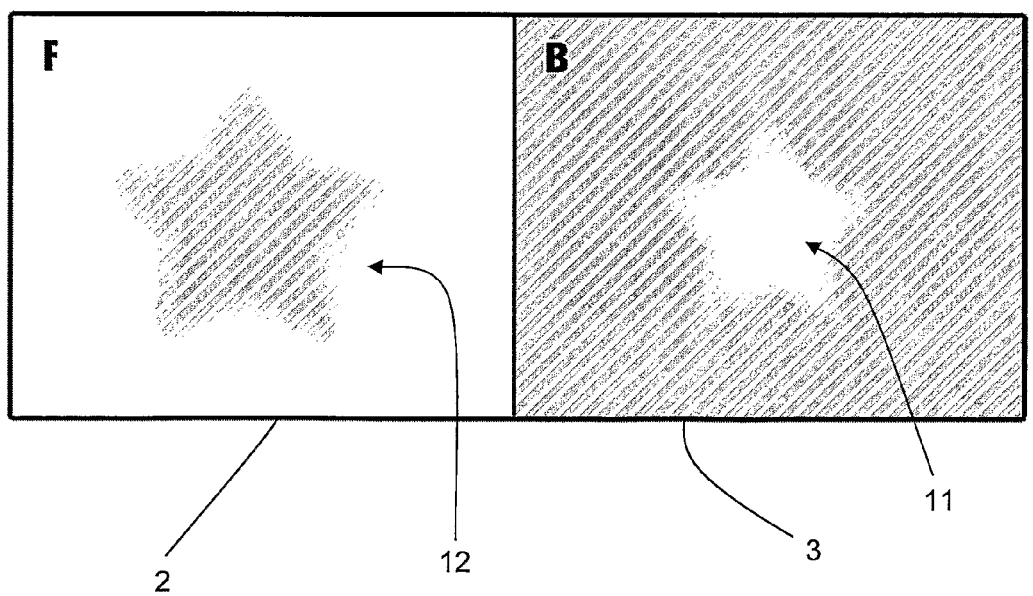

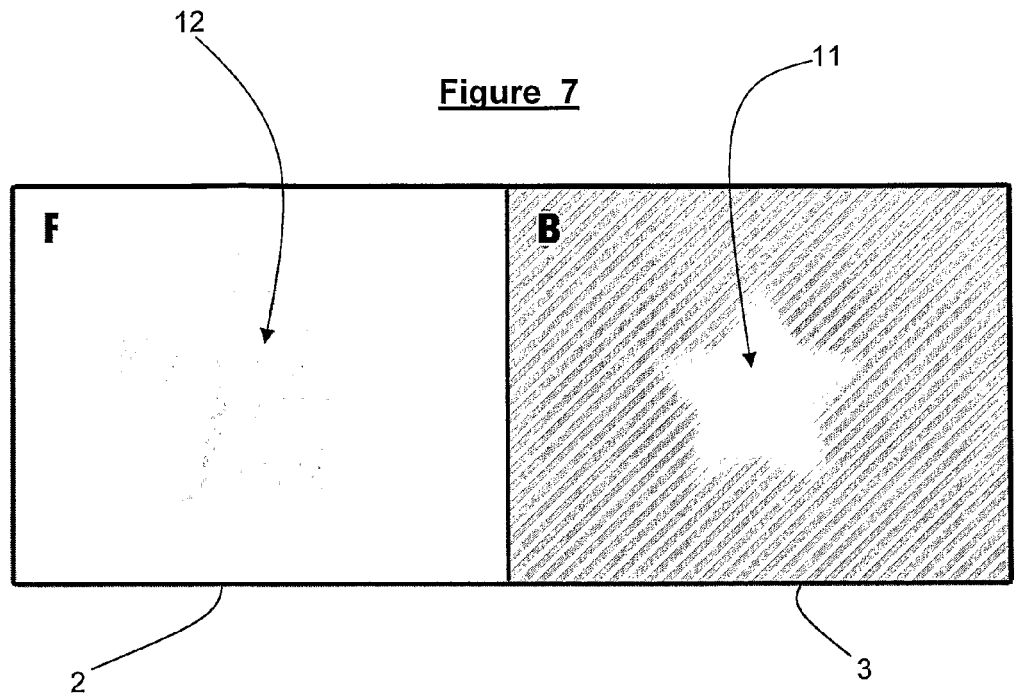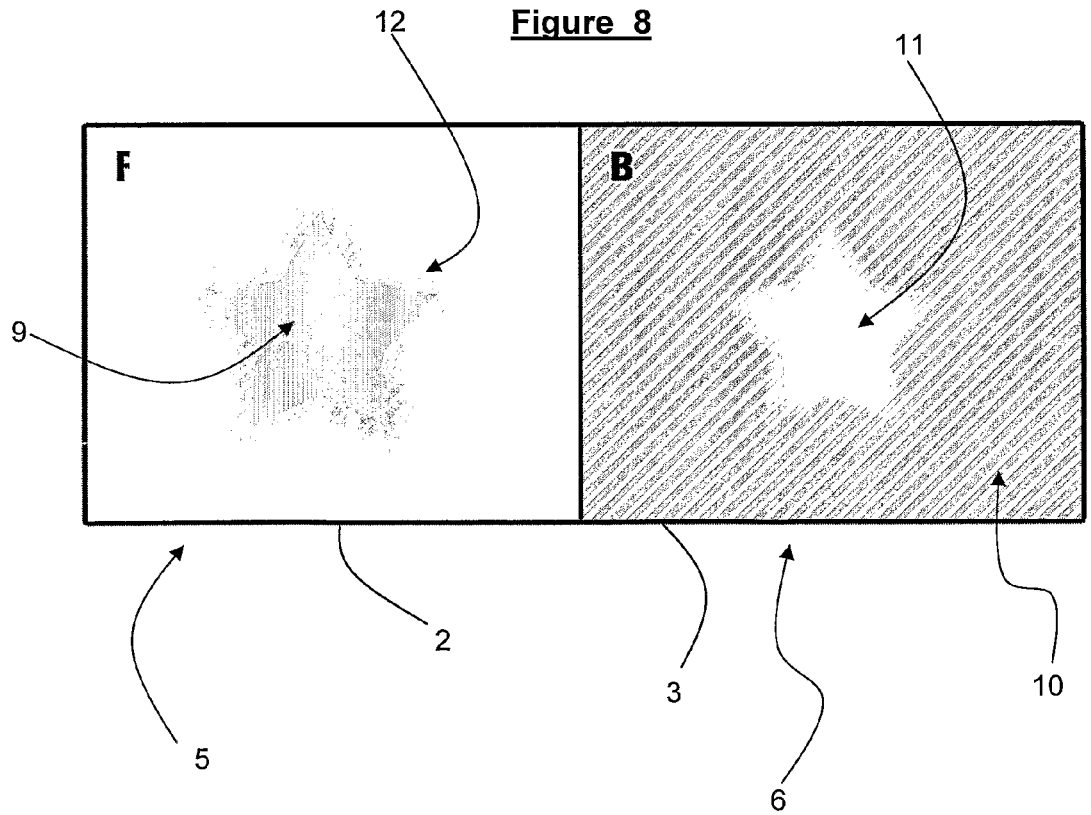

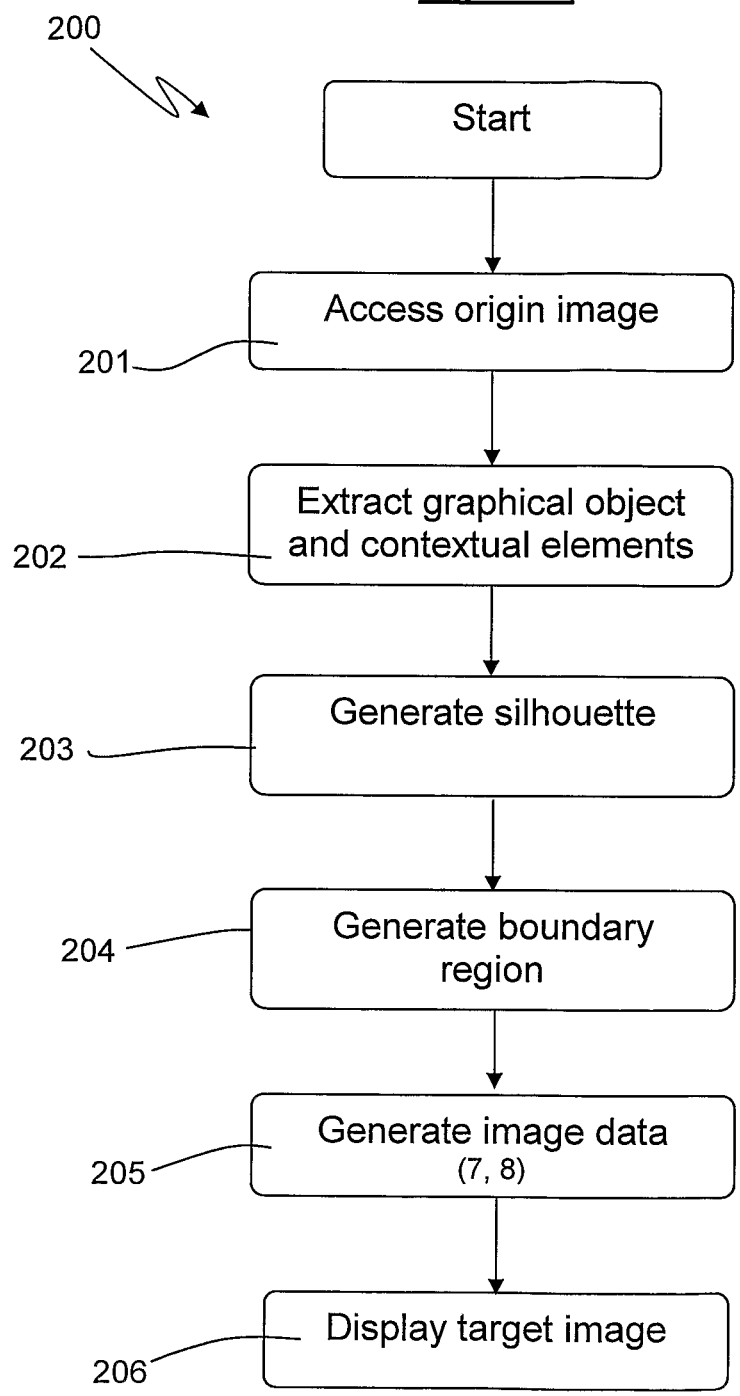

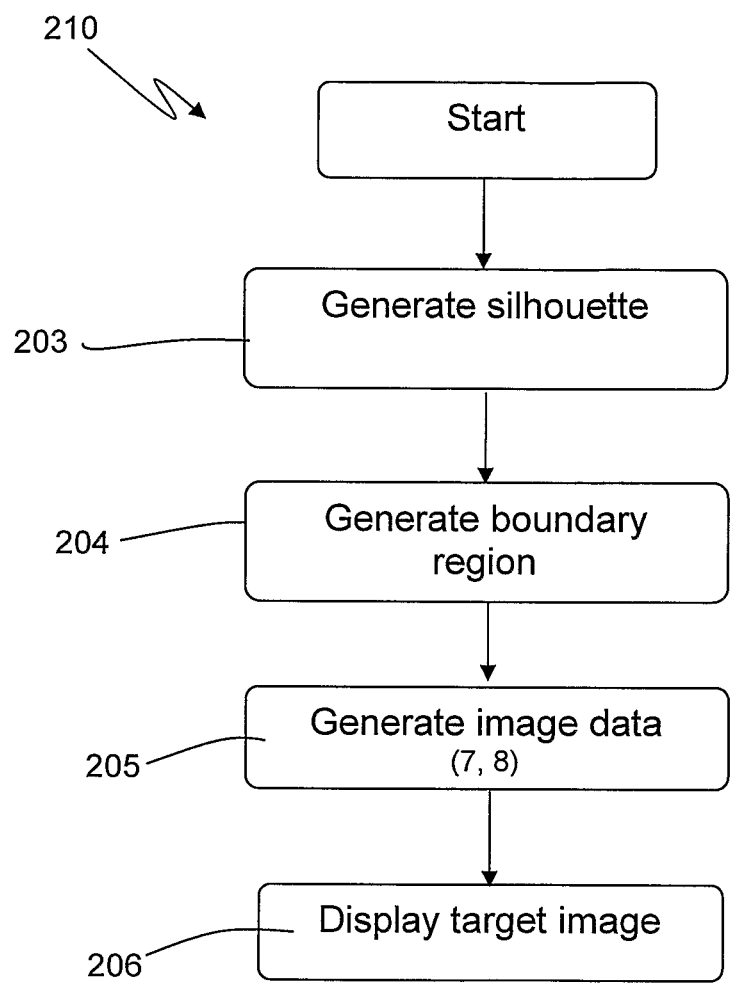

//MULTI-LAYERED DISPLAYS

RELATED APPLICATIONS

The present application is a National Stage Application filed under 35 U.S.C. §371 of International Patent Application Number PCT/IB2009/006645, filed Aug. 26, 2009, which claims the benefit of New Zealand Patent Number 570812, filed Aug. 26, 2008. These applications are incorporated herein by reference in their entirety and for all purposes.

FIELD OF THE INVENTION

The invention relates to improvements in and relating to electronic visual displays and in particular to improved methods, systems and computer software for generating images on multi-focal plane displays.

BACKGROUND

Electronic display technology for displaying graphical images and/or text has evolved dramatically to meet the pervasive user demand for more realistic and interactive displays. A wide range of display technologies with differing capabilities are now available including:
  Cathode Ray Tube (CRT)
  Bistable display
  Electronic paper
  Nixie tube displays
  Vector display
  Flat panel display
  Vacuum fluorescent display (VF)
  Light-emitting diode (LED) displays
  Electroluminescent Displays (ELD)
  Plasma display panels (PDP)
  Liquid crystal display (LCD)
    High-Performance Addressing (HPA)
    Thin-film transistor displays (TFT)
  Organic light-emitting diode displays (OLED)
  Surface-conduction electron-emitter display (SED) (experimental)
  Laser TV (forthcoming)
  Carbon nanotubes (experimental)
  Nanocrystal displays (experimental), using quantum dots to make vibrant, flexible screens.

However, most display technologies are generally only capable of displaying two-dimensional images on a single screen. The ability to form images at different depths within a display, whether real or perceived, has been the subject of significant and ongoing research and development in the quest to provide display technology capable of replicating or augmenting the depth effects conferred by normal human sight.

The manner in which human beings process visual information has been the subject of extensive and prolonged research in an attempt to understand this complex process.

This research has included the effects of depth or 'apparent depth' provided by volumetric, three-dimensional or multi-focal plane displays.

The term "preattentive processing" has been coined to denote the act of the subconscious mind in analysing and processing visual information which has not become the focus of the viewer's conscious awareness.

When viewing a large number of visual elements, certain variations or properties in the visual characteristics of elements can lead to rapid detection by preattentive processing. This is significantly faster than requiring a user to individually scan each element, scrutinising for the presence of the said properties. Exactly what properties lend themselves to preattentive processing has in itself been the subject of substantial research. Colour, shape, three-dimensional visual clues, orientation, movement and depth have all been investigated to discern the germane visual features that trigger effective preattentive processing.

Researchers have conducted experiments using target and boundary detection in an attempt to classify preattentive features. Preattentive target detection was tested by determining whether a target element was present or absent within a field of background distractor elements. Boundary detection involves attempting to detect the boundary formed by a group of target elements with a unique visual feature set within distractors. It may be readily visualised for example that a red circle would be immediately discernible set amongst a number of blue circles.

Equally, a circle would be readily detectable if set amongst a number of square shaped distractors. In order to test for preattentiveness, the number of distractors as seen is varied and if the search time required to identify the targets remains constant, irrespective of the number of distractors, the search is said to be preattentive. Similar search time limitations are used to classify boundary detection searches as preattentive.

A widespread threshold time used to classify preattentiveness is 200-250 milliseconds as this only allows the user opportunity for a single 'look' at a scene. This timeframe is insufficient for a human to consciously decide to look at a different portion of the scene. Search tasks such as those stated above maybe accomplished in less than 200 milliseconds, thus suggesting that the information in the display is being processed in parallel unattendedly or pre-attentively.

However, if the target is composed of a conjunction of unique features, i. e. a conjoin search, then research shows that these may not be detected preattentively. Using the above examples, if a target is included for example, of a red circle set within distractors including blue circles and red squares, it is not possible to detect the red circle preattentively as all the distractors include one of the two unique features of the target.

Whilst the above example is based on a relatively simple visual scene, Enns and Rensink [1990] identified that targets given the appearance of being three dimensional objects can also be detected preattentively. Thus, for example a target represented by a perspective view of a cube shaded to indicate illumination from above would be preattentively detectable amongst a plurality of distractor cubes shaded to imply illumination from a different direction. This illustrates an important principle in that the relatively complex, high-level concept of perceived three dimensionality may be processed preattentively by the sub-conscious mind.

In comparison, if the constituent elements of the above described cubes are re-orientated to remove the apparent three dimensionality, subjects cannot preattentively detect targets which have been inverted for example. Additional experimentation by Brown et al [1992] confirm that it is the three dimensional orientation characteristic which is preattentively detected. Nakaymyama and Silverman [1986] showed that motion and depth were preattentive characteristics and that furthermore, stereoscopic depth could be used to overcome the effects of conjoin. This reinforced the work done by Enns Rensink in suggesting that high-level information is conceptually being processed by the low-level visual system of the user. To test the effects of depth, subjects were tasked with detecting targets of different binocular disparity relative to the distractors. Results showed a constant response time irrespective of the increase in distractor numbers.

These experiments were followed by conjoin tasks whereby blue distractors were placed on a front plane whilst red distractors were located on a rear plane and the target was either red on the front plane or blue on the rear plane for stereo colour (SC) conjoin tests, whilst stereo and motion (SM) trials utilised distractors on the front plane moving up or on the back plane moving down with a target on either the front plane moving down or on the back plane moving up.

Results showed the response time for SC and SM trials were constant and below the 250 milliseconds threshold regardless of the number of distractors. The trials involved conjoin as the target did not possess a feature unique to all the distractors. However, it appeared the observers were able to search each plane preattentively in turn without interference from distractors in another plane.

This research was further reinforced by Melton and Scharff [1998] in a series of experiments in which a search task consisting of locating an intermediate-sized target amongst large and small distractors tested the serial nature of the search whereby the target was embedded in the same plane as the distractors and the preattentive nature of the search whereby the target was placed in a separate depth plane to the distractors.

The relative influence of the total number of distractors present (regardless of their depth) versus the number of distractors present solely in the depth plane of the target was also investigated. The results showed a number of interesting features including the significant modification of the response time resulting from the target presence or absence. In the target absence trials, the reaction times of all the subjects displayed a direct correspondence to the number of distractors whilst the target present trials did not display any such dependency. Furthermore, it was found that the reaction times in instances where distractors were spread across multiple depths were faster than for distractors located in a single depth plane.

Consequently, the use of a plurality of depth/focal planes as a means of displaying information can enhance preattentive processing with enhanced reaction/assimilation times.

Three-dimensional or multi-focal plane displays are known to provide numerous advantages or capabilities unavailable with conventional two-dimensional displays.

Examples of a three-Dimensional and multi-focal plane displays include Stereoscopic displays and Multi-Layer Displays (MLD) respectively.

Known three-dimensional displays seek to provide binocular depth cues to the viewer via a variety of techniques including separate head-mounted displays located directly in front of each eye, lenticular displays and holography. Unfortunately, each of these possesses certain limitations. Head-mounted displays add ergonomic inconvenience, reduce the viewer's peripheral awareness and are often cumbersome and can cause nausea, headaches and/or disorientation. Lenticular displays are only really effective at oblique viewing angles and holography is currently limited to displaying static images.

Stereoscopic (and auto-stereoscopic) displays provide the appearance of a 3D image by providing slightly different visual images to the left and right eyes of the viewer to utilise the binocular capabilities of the human visual system.

MLD systems are multi-focal plane displays that use multiple layered screens or 'display layers' aligned parallel with each other in a stacked arrangement with a physical separation between each screen. Each screen is capable of displaying images on a different focal plane and thus such MLD systems are often referred to as Multi-focal plane displays. Thus, multiple images separated by a physical separation or 'depth' can be displayed on one display. PCT Publication No. WO 99142889 discloses such an MLD in which depth is created by displaying images on the background screen furthest from the viewer which will appear at some depth behind images displayed on the screen(s) closer to the user. The benefits of MLDs, in particular those utilising the technology described in the published PCT Patent Publication Nos. WO 1999/042889 and WO 1999/044095 are gaining increasingly widespread recognition and acceptance due to their enhanced capabilities compared to conventional single focal plane displays (SLD).

The benefits of MLDs are especially germane to displays using liquid crystal displays (LCD), though MLDs can also be formed using other display technologies, e.g. an LCD front display layer may be layered in front of an OLED rear display layer.

There are two main types of Liquid Crystal Displays used in computer monitors, passive matrix and active matrix. Passive-matrix Liquid Crystal Displays use a simple grid to supply the charge to a particular pixel on the display. Creating the grid starts with two glass layers called substrates. One substrate is given columns and the other is given rows made from a transparent conductive material. This is usually indium tin oxide. The rows or columns are connected to integrated circuits that control when a charge is sent down a particular column or row. The liquid crystal material is sandwiched between the two glass substrates, and a polarizing film is added to the outer side of each substrate.

A pixel is defined as the smallest resolvable area of an image, either on a screen or stored in memory. Each pixel in a monochrome image has its own brightness, from 0 for black to the maximum value (e.g. 255 for an eight-bit pixel) for white. In a colour image, each pixel has its own brightness and colour, usually represented as a triple of red, green and blue intensities. To turn on a pixel, the integrated circuit sends a charge down the correct column of one substrate and a ground activated on the correct row of the other. The row and column intersect at the designated pixel and that delivers the voltage to untwist the liquid crystals at that pixel.

The passive matrix system has significant drawbacks, notably slow response time and imprecise voltage control. Response time refers to the Liquid Crystal Displays ability to refresh the image displayed. Imprecise voltage control hinders the passive matrix's ability to influence only one pixel at a time. When voltage is applied to untwist one pixel, the pixels around it also partially untwist, which makes images appear fuzzy and lacking in contrast. Active-matrix Liquid Crystal Displays depend on thin film transistors (TFT). Thin film transistors are tiny switching transistors and capacitors. They are arranged in a matrix on a glass substrate.

To address a particular pixel, the proper row is switched on, and then a charge is sent down the correct column. Since all of the other rows that the column intersects are turned off, only the capacitor at the designated pixel receives a charge. The capacitor is able to hold the charge until the next refresh cycle. And if the amount of voltage supplied to the crystal is carefully controlled, it can be made to untwist only enough to allow some light through. By doing this in very exact, very small increments, Liquid Crystal Displays can create a grey scale.

Most displays today offer 256 levels of brightness per pixel. A Liquid Crystal Display that can show colours must have three sub-pixels with red, green and blue colour filters to create each colour pixel. Through the careful control and variation of the voltage applied, the intensity of each sub-pixel can range over 256 shades. Combining the sub-pixel produces a possible palette of 16.8 million colours (256 shades of red×256 shades of green×256 shades of blue). Liquid Crystal Displays employ several variations of liquid crystal technology, including super twisted nematics, dual scan twisted nematics, ferroelectric liquid crystal and surface stabilized ferroelectric liquid crystal. They can be lit using ambient light in which case they are termed as reflective, backlit and termed Transmissive, or a combination of backlit and reflective and called transflective.

There are also emissive technologies such as Organic Light Emitting Diodes (OLED), and other similar technologies which project an image directly onto the back of the retina which are addressed in the same manner as Liquid Crystal Displays.

To aid clarity and avoid prolixity, reference herein will be made to an "MLD" with two display layers, i.e. an MLD having front and rear display layers. However, this should not be seen to be limiting as the MLD may include three or more display layers as required by the application.

In general an MLD is used to simultaneously display images on the front and rear display layers. The MLD is configured to display output image data from a computer system, video/image feed or other image generator and in most applications the images are composite images formed from multiple image components, e.g. a foreground object and a background scene or a computer mouse cursor and computer software Graphical User Interface GUI. The image components may be displayed on the same display layer or spread between both display layers.

For ease of reference, the position of the image components or 'graphical objects' on each display layer can be given as a range of orthogonal x and y co-ordinates representative of the spatial position of the image component in the plane of a display layer relative to a common fixed reference point, e.g. the edge of a display layer, viewer's position or a fixed external focal point.

Where two images are simultaneously displayed at the same x and y co-ordinates on the different display layers, the images will overlap. The image on the front display layer may thus appear to be at least partially transparent, as the image on the rear display layer may be visible through the front image component. The overlapping images can thus interfere and often the front image will appear unclear or 'ghostly'.

This problem has been addressed previously in the prior art by generating a 'shadow' or 'silhouette' of the front image component and displaying on the rear display layer behind the front image component. The silhouette is a representative image having the same general outline as the original front image and is typically 'white' i.e. the silhouette region of the rear display is made substantially transparent. Displaying the silhouette behind the front image component removes any interference from overlapped rear image components and thereby increases the clarity and perceived opacity of the front image component. An example of this 'white shadow' technique is described in WO2007/040413 which is herein incorporated by reference.

A similar technique may be used to increase the visibility of an image component appearing on a rear display layer whereby a silhouette of the rear image component is displayed on the front display layer overlapping the rear image component, thereby removing any overlapping interfering front image components minimising any interference with the rear image component.

In most MLDs the display layers are spaced apart, for example by about 7 mm in the MLD described in WO99/142889. This physical separation provides the visual depth observed when using these displays. However, when using the aforementioned silhouetting method on such an MLD, a viewer viewing the display from an off-centre position will be able to identify the edges of the silhouette on the rear display layer behind the origin image component due to parallax, thereby reducing the beneficial effect provided by the silhouette.

It would thus be advantageous to provide a method of silhouetting an origin image component in a volumetric display such as an MLD to reduce interference between overlapping image components while reducing the visibility of the perceived visibility of the silhouette.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

DISCLOSURE OF INVENTION

The following terminology will be used throughout the specification and the intended meaning of each term is described below.

It will be appreciated that as used herein, the term:

"image" refers to any visible effect, including a graphical image, still images, video, frames of a video or other moving imagery, frame-less moving imagery, graphical objects, text, pattern, symbol, design, shadow or other visible effect;

"graphical object" refers to any part or portion of an image and may include multiple distinct images or image parts, contiguous portions of the same image, non-contiguous portions of the same image.

"contextual elements" refers to any image, or graphical object displayed on a background display layer, or second display layer, or portion of same. The contextual elements attributes may include pattern, colour, shading, contrast, intensity, hue and the like. Contextual elements may be displayed uniformly across a display layer or vary in different display layer locations and/or be absent altogether.

"image data" refers to any information or data specifying an aspect, facet or parameter of an image or part thereof, e.g. position, size, shape, orientation, colour, contrast, brightness, intensity, hue, position, shading, depth, or any other aspect, facet or parameter;

"display" refers to any display system including one or more electronic display layers capable of generating a visible image and may include, by way of example, one or more display layers formed from a: Cathode Ray Tube (CRT), Liquid Crystal Display (LCD), Organic Light Emitting Diode (OLED), Light Emitting Diode (LED), Plasma display panels (PDP), Surface-conduction electron-emitter display (SED), Laser TV, or any other known or future display technology;

"spatial relationship" refers to the spatial relationship between two images or parts of an image with respect to their displayed position.

It should be noted that reference herein to the singular also includes the plural and vice versa.

For ease of reference, computer program (hereinafter software) algorithms, procedures, functions, engines and other software components are described individually with respect to their intended function. However, it should be appreciated that these software components may also be combined, operated independently, interlinked, integrated or otherwise manipulated without departing from the spirit or scope of the present invention.

Reference herein to an MLD having two display layers should not be seen to be limiting as the principles of the present invention may be easily extrapolated for display on an MLD with three or more display layers.

According to one aspect of the present invention there is provided a computer-implemented method of generating images on a multi-layered display (MLD), the MLD including:
  a first display layer including a first plurality of pixels, the first display layer operable to display a first image using at least some of said pixels;
  a second display layer including a second plurality of pixels, the second display layer operable to display a second image using at least some of said second plurality of pixels, wherein one said display layer overlaps the other said display layer;
wherein said computer-implemented method includes execution of an image generation algorithm embodied in computer readable instructions stored in a computer-readable medium, said image generation algorithm executable to:
  display a target image on a MLD display, said target image including:
    a graphical object displayed on the first display layer, and
    contextual elements displayed on the second display layer,
wherein a projection of the graphical object on the first display layer demarcates a silhouette on the second layer.

Preferably, the target image is formed from an origin image having a graphical object and contextual elements.

Preferably, said silhouette is composed of said origin image graphical object.

Preferably, at least a portion of said silhouette is displayed with an RGB value proportional to the square root of the RGB value of a corresponding portion of said origin image graphical object and more preferably, at least a portion of said silhouette is displayed with an RGB value equal to the square root of the RGB value of the corresponding portion of said origin image graphical object.

Preferably, the RGB value of at least a portion of the graphical object displayed in the target image is proportional to the RGB value of the corresponding origin image graphical object divided by the RGB value of a corresponding portion of the silhouette.

Preferably, at least a portion of said silhouette is displayed with an alpha value proportional to the square root of the alpha value of a corresponding portion of said origin image graphical object and more preferably, at least a portion of said silhouette is displayed with an alpha value equal to the square root of the alpha value of the corresponding portion of said origin image graphical object.

Preferably, the alpha value of at least a portion of the graphical object displayed in the target image is proportional to the alpha value of the corresponding origin image graphical object divided by the alpha value of a corresponding portion of the silhouette.

Each pixel in an LCD screen stores RGB values for colour and an additional value between 0 and 1, i.e. the alpha value. The alpha value determines how comparatively opaque or transparent an image element is in relation to other image elements that are displayed over the same pixels. For example, 40% alpha value for an image element will mean that it is 60% transparent (or 40% opaque).

It will be appreciated that if the silhouette is displayed with the same 'alpha' value (i.e. transparency/opacity value) of the origin image graphical object the target image will appear with an alpha value equal to the silhouette alpha value multiplied by the graphical object alpha value, i.e. with an alpha value squared. The silhouette is thus preferably displayed with an alpha value equal to the square root of the origin image graphical object alpha value and the alpha value of the target image graphical object is divided by the resultant silhouette alpha value to compensate.

Preferably, said silhouette is composed of a blurred copy of said origin image graphical object.

The graphical object may thus be displayed on one display layer overlapping/overlapped by a silhouette (e.g. a copy of the graphical object) on the other display layer. The contextual elements will thus not be visible through the graphical object. Also, as the silhouette is a copy of the graphical object, an observer viewing the graphical object off-centre will therefore not be able to discern the silhouette. A composite target image may be formed that enhances the visibility of the graphical object with respect to the contextual elements.

It will be appreciated that the present invention may also be embodied in a computer system, multi-layered display or image generation algorithm configured to perform these methods.

According to one aspect of the present invention there is provided a computer-implemented method of generating images on a multi-layered display (MLD), the MLD including:
  a first display layer including a first plurality of pixels, the first display layer operable to display a first image using at least some of said pixels;
  a second display layer including a second plurality of pixels, the second display layer operable to display a second image using at least some of said second plurality of pixels, wherein one said display layer overlaps the other said display layer;
wherein said computer-implemented method includes execution of an image generation algorithm embodied in computer readable instructions stored in a computer-readable medium, said image generation algorithm executable to:
  display a target image on a MLD display, said target image including:
    a graphical object displayed on the first display layer, and
    contextual elements displayed on the second display layer,
wherein said graphical object is provided with a peripheral boundary region composed of contextual elements displayed on the second display layer.

According to one aspect of the present invention there is provided a computer system configured to generate images for display on a multi-layered display (MLD), the MLD including:

a first display layer including a first plurality of pixels, the first display layer operable to display a first image using at least some of said pixels;

a second display layer including a second plurality of pixels, the second display layer operable to display a second image using at least some of said second plurality of pixels, wherein one said display layer overlaps the other said display layer;

wherein said computer system includes a system memory coupled by a bus to a processor, and wherein the system memory stores executable computer readable instructions embodying an image generation algorithm executable to generate target image data for display as a target image on a MLD display, said target image data including:

first image data including data for display of a first image including a graphical object displayed on the first display layer, and second image data including data for display of a second image including contextual elements displayed on the second display layer, wherein said first image data includes data for display of a peripheral boundary region of said graphical object composed of contextual elements displayed on the second display layer.

According to one aspect of the present invention there is provided an image generation algorithm embodied in computer readable instructions and executable by a computer system to generate target image data corresponding to a target image for display on a multi-layered display (MLD), the MLD including:

a first display layer including a first plurality of pixels, the first display layer operable to display a first image using at least some of said pixels;

a second display layer including a second plurality of pixels, the second display layer operable to display a second image using at least some of said second plurality of pixels, wherein one said display layer overlaps the other said display layer;

wherein said image generation algorithm is executable to generate target image data for display as a target image on a MLD display, said target image data including:

first image data including data for display of a first image including a graphical object displayed on the first display layer, and second image data including data for display of a second image including contextual elements displayed on the second display layer, wherein said first image data includes data for display of a peripheral boundary region of said graphical object composed of contextual elements displayed on the second display layer.

According to a further aspect, said image generation algorithm is executable to generate said target image data by processing origin image data corresponding to an origin image having a said graphical object and contextual elements.

In a further embodiment, said origin image data is processed to extract graphical object image data and contextual element image data respectively corresponding to said graphical object and said contextual elements.

According to one aspect, the second display layer may be provided with contextual elements with a substantially uniform appearance across substantially the whole second display layer. In such embodiments, the contextual elements used to provide said peripheral boundary region of the graphical object need not be matched to a specific location of the second display layer.

In alternative embodiments, the second display layer may display a variety of differing images and contextual elements. Consequently, in order for the peripheral boundary region of a graphical object on the first display layer to merge unobtrusively with the second display layer, the contextual elements on both display layers need to be matched. Consequently, in an alternative embodiment, said peripheral boundary region contextual elements correspond to those contextual elements on the second display layer overlapped by and/or adjacent to the graphical object on the first display layer.

Preferably, the graphical object on the first display layer demarcates a silhouette on the second layer.

Preferably, said silhouette bounds a region of the second display layer without any contextual elements.

Preferably, the second display layer region bounded by said silhouette displays a pattern, texture, intensity, colour or hue which is not visible or discernable through the graphical object on the first display layer.

Preferably, said silhouette region is 'white', i.e. the silhouette region of the second display layer is made substantially transparent with the white light from a backlight being transmitted therethrough.

Preferably, said silhouette peripheral boundaries are coterminous with, or located within the overlapping boundaries of the graphical object on the first display layer.

Preferably said silhouette peripheral boundaries are concentric with the overlapping boundaries of the graphical object on the first display layer.

According to a further aspect, said image generation algorithm is executable to:

a) retrieve target image data relating to said target image;
b) process said target image data to:
generate graphical object data and contextual element image data respectively corresponding to said graphical object and said contextual elements for respective display on the first and second display layers;
process said graphical object image data and generate silhouette data corresponding to said silhouette;
process said contextual element image data to generate boundary region data corresponding to said boundary region.

In a further embodiment said first and second images are respectively displayed on said first and second display layers, the first image overlapping the second image or vice versa and:

said second image includes the silhouette and said contextual elements, said first image includes the graphical object and said boundary region.

According to a yet further embodiment, the peripheral boundary region of the graphical object and/or the silhouette peripheral boundary are manipulated to visually de-emphasize said boundaries.

Preferably, said manipulation includes one or more of: feathering, blending, defocusing, dithering, graduating, grading, sequencing, serializing, tapering the pattern, texture, intensity, colour, contrast, alpha values, RGB values, saturation, brightness, or hue of said boundaries.

The manipulation of the peripheral boundaries of both the graphical objects and/or the silhouette attenuates the observer's awareness of the depth separation between the boundaries and instead presents the appearance of an uninterrupted continuum.

It will be readily understood that the present invention resides not only in the method of displaying images but also in the displayed image itself.

Thus, according to a further aspect, the present invention provides images displayed on a MLD produced by the method substantially as hereinbefore described.

Further aspects and advantages of the present invention will become apparent from the ensuing description which is given by way of example only.

BRIEF DESCRIPTION OF THE DRAWINGS

The present invention is illustrated by way of example, and not by way of limitation, in the figures of the accompanying drawings and in which like reference numerals refer to similar elements.

FIG. 1a shows a schematic exploded cross-sectional view of a multi-layered display (MLD) in accordance with one preferred embodiment of the present invention;

FIG. 1b shows a schematic exploded perspective view of the MLD of FIG. 1 with a target image displayed thereon;

FIG. 5 shows a silhouette of the graphical object of FIGS. 3 and 4 displayed on the rear screen of the multi-layered display;

FIG. 6 shows a boundary region of the graphical object of FIGS. 3-5 displayed on the front screen of the multi-layered display;

FIG. 7 shows the boundary region of FIG. 6 in a blurred state;

FIG. 8 shows the target image displayed as first and second images according to one aspect of the present invention;

FIG. 9 shows a method according to one embodiment of the present invention;

FIG. 10 shows a method according to another embodiment of the present invention;

DETAILED DESCRIPTION

Figure 2:
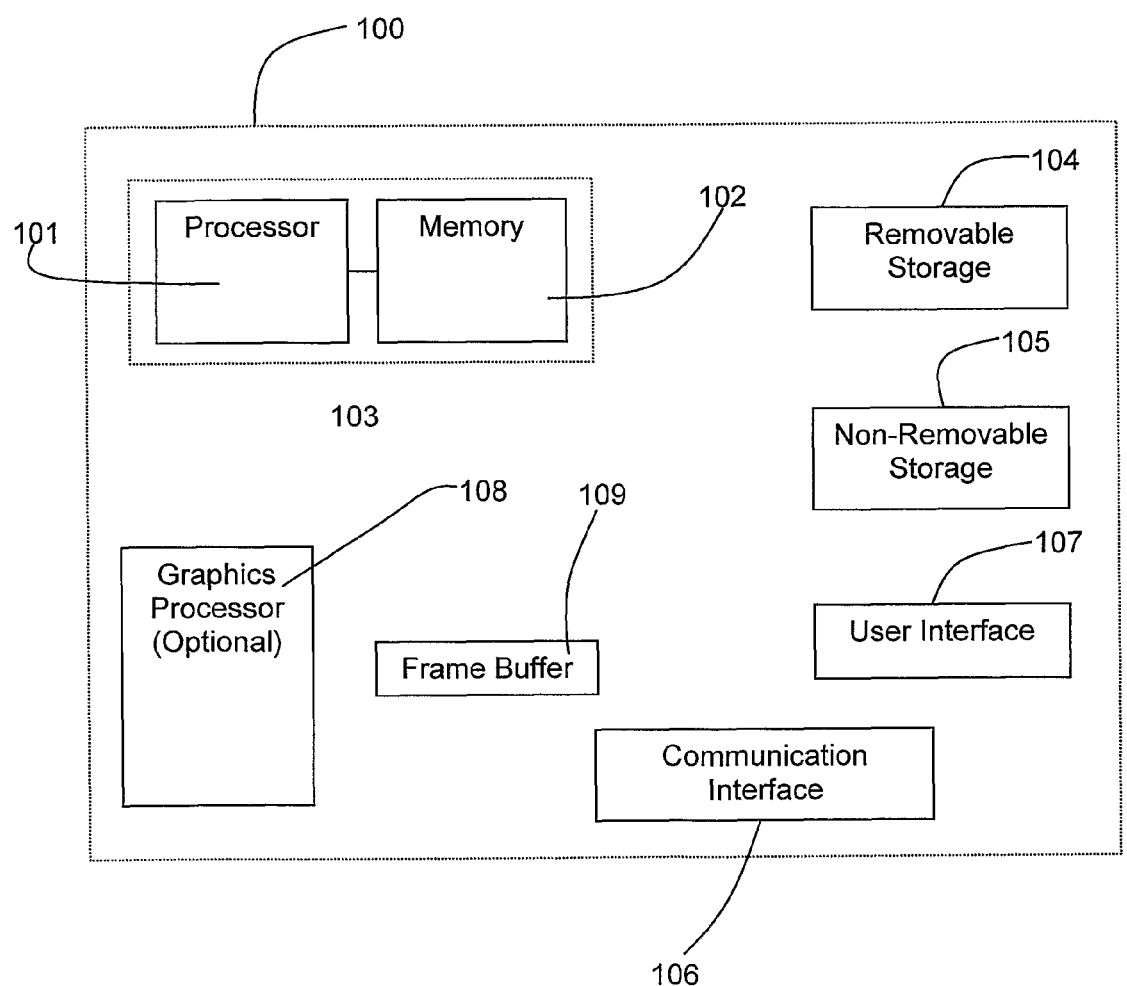
FIG. 2 shows a schematic diagram of an exemplary general purpose computer system platform upon which embodiments of the present invention may be implemented.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, function, or the like, is conceived to be a self-consistent sequence of steps or instructions leading to a desired result. Reference herein will also be made to various "algorithms" which should be understood to refer to one or more computer-implemented processes, procedures, functions, calculations capable of accessing, reading, processing, modifying, creating or otherwise manipulating data.

The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "delivering," "depicting," "detecting," "determining," "displaying," "establishing," "executing," "filtering," "flipping," "generating," "grouping," "hiding," "identifying," "initiating," "interacting," "modifying," "monitoring," "moving," "outputting," "performing," "placing," "positioning," "presenting," "processing," "programming," "querying," "removing," "repeating," "resuming," "sampling," "selecting," "simulating," "sorting," "storing," "subtracting," "suspending," "tracking," "transcoding," "transforming," "transferring," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Volumetric displays or multi-layered displays include two or more display layers arranged in a stacked, spaced apart arrangement. Given this arrangement there will be a foremost and a rearmost display as a minimum. In addition, there may be additional display layers located intermediate the foremost and rearmost display. Suitable volumetric displays are described in U.S. Pat. No. 6,906,792 and include by way of example the Multi-Layer Displays™ licensed by PureDepth, Inc.

The display layers can be formed from various substrates, including, by way of example, LCD, OLED, TOLED, plasma etc. Notwithstanding that at least part of the foremost display layer is capable of being made substantially transparent such that an overlapped display are visible through the foremost layer. Liquid crystal displays have been most commonly used to form the display layers to date. Such multi-layered displays allow the display of discrete information on foremost and rearmost screens.

One embodiment of a multi-layered display is shown in FIG. 1 and is composed of first and second display layers provided in the form of front (2) and rear (3) LCD screens.

The front (2) and rear (3) screens are positioned, parallel to, but spaced apart from each other with the front screen (2) overlapping the rear screen(3). A backlight array (4) is provided behind the rear screen (3) for providing the necessary light to the LCD screens (2, 3). As will be appreciated by one skilled in the art, each LCD screen (2, 3) includes a respective plurality of pixels capable of forming respective first (5) and second (6) images. The first screen (2) is operable to display the first image (5) using at least some of its pixels and the second screen (3) is operable to display a second image (6) using some of its pixels. The first screen (2) overlaps the second screen (3) and thus can be considered a 'front' screen with the second screen being a 'rear' screen.

A pixel is defined as the smallest resolvable area of an image, either on a screen or stored in memory. Each pixel in a monochrome image has its own brightness, from 0 for black to the maximum value (e. g. 255 for an eight-bit pixel) for white. In a colour image, each pixel has its own brightness and colour, usually represented as a combination of red, green and blue intensities.

It should be apparent to one skilled in the art that a number of alternative display technologies may be utilised in place of the LCD screens (2, 3). Furthermore, although FIG. 1 shows a single screen (1) in front of the rear screen (3) for the sake of clarity and convenience, any number of additional (at least partially transparent) display layers may be incorporated. Such displays provide a three dimensional quality to the scene viewed by an observer, as described in PCT publication Nos. WO/1999/042889 and WO/1999/044095, incorporated by reference herein.

Although, as previously stated, the present invention is not specifically restricted to the use of Liquid Crystal Display screens, for example, OLED, TOLED, Plasma or other display technologies may also be utilised for the first and/or second display layers. However, for ease of reference, embodiments of the present invention will be described using LCD displays. By way of a brief overview of LCDs, there are two main types of Liquid Crystal Displays used in computer monitors, passive matrix and active matrix.

Passive-matrix Liquid Crystal Displays use a simple grid to supply electrical charge to a particular pixel on the display. The grids made from a transparent conductive material (usually indium tin oxide), are formed using two glass layers called substrates, one provided with columns, the other with rows. The rows or columns are connected to integrated circuits that control when a charge is applied to a particular column or row. The liquid crystal material is sandwiched between the two glass substrates, and a polarizing film is added to the outer side of each substrate. To activate a particular pixel, the integrated circuit applies a charge to the relevant column of one substrate whilst grounding the corresponding row on the other substrate. The voltage applied to the intersection of the relevant row and column designating the pixel untwists the liquid crystals at that pixel.

However, the passive matrix system has significant drawbacks, notably slow response time and imprecise voltage control. Response time refers to the Liquid Crystal Displays ability to refresh the image displayed. Imprecise voltage control hinders the passive matrix's ability to influence a single pixel at a time. When voltage is applied to untwist one pixel, the pixels around it also partially untwist, which makes images appear fuzzy and lacking in contrast.

Active-matrix Liquid Crystal Displays depend on thin film transistors (TFT). Thin film transistors are tiny switching transistors and capacitors arranged in a matrix on a glass substrate. To address a particular pixel, the appropriate row is switched on, and then a charge is sent down the correct column. Since all of the other rows that the column intersects are turned off, only the capacitor at the designated pixel receives a charge. The capacitor is able to hold the charge until the next refresh cycle. Furthermore, if the amount of voltage supplied to the crystal is carefully controlled, it can be made to untwist only enough to allow some light through. By doing this in very exact, very small increments, Liquid Crystal Displays can create a greyscale. Most displays today offer 256 levels of brightness per pixel providing a 256-increment greyscale.

A Liquid Crystal Display that can show colours must have three subpixels with red, green and blue (RGB) colour filters to create each colour pixel. Through the careful control and variation of the voltage applied, the intensity of each subpixel can range over 256 shades. Combining the subpixels produces a possible palette of 16.8 million colours (256 shades of red×256 shades of green×256 shades of blue).

Liquid Crystal Displays employ several variations of liquid crystal technology, including super twisted nematics, dual scan twisted nematics, ferroelectric liquid crystal and surface stabilized ferroelectric liquid crystal. There are also emissive technologies such as Organic Light Emitting Diodes which are addressed in the same manner as Liquid Crystal Displays.

However, there are a number of practical considerations need to be addressed to produce a functional displays utilising multiple overlapping LCD screens, including the reduction or elimination of moire interference effects, coloured fringes, and crossed-polarisers, which are addressed in a number of ways including the use of diffusers, optical retarders and other optical materials and/or material finishes.

To aid understanding and for the sake of clarity, the MLD (1) and associated display screens (2, 3) are shown in simplified, schematic form in the drawings.

FIG. 2 shows an exemplary general purpose computer system (100) which may be used to implement embodiments of the present invention. It will be appreciated that the computer system (100) shown in FIG. 2 is exemplary only and embodiments of the present invention may operate within a number of different systems including, but not limited to, embedded computer systems, portable and hand-held computer systems, mobile phones, or any computer system having the same general components or equivalents to the computer system shown in FIG. 2.

The computer system (100) has a processor (101) and at least one system memory (102) coupled by a bus (103) to the processor (101). The processor (101) may comprise a central processing unit (CPU) or other type of processor. Depending on the configuration and/or type of computer system environment, memory (102) may comprise volatile memory (e.g., RAM), non-volatile memory (e.g., ROM, flash memory, etc.), or some combination of the two. Additionally, memory (102) may be removable or non-removable. The computer system (100) may also have additional storage (e.g., removable storage (104), non-removable storage (105) or the like). Removable storage (104) and/or non-removable storage (105) may comprise volatile memory, non-volatile memory, or any combination thereof. Additionally, removable storage (104) and/ or non-removable storage (105) may comprise CD-ROM, digital versatile disks (DVD), flash drives, solid state storage devices, or other optical storage, magnetic cassettes, magnetic tape, magnetic disk storage or other magnetic storage devices, or any other medium which can be used to store information for access by the computer system (100).

As shown in FIG. 2, the computer system (100) can communicate with other systems, components, or devices via a communication interface (106). Communication interface (106) may embody computer readable instructions, data structures, program modules or other data in a modulated data signal (e.g., a carrier wave) or other transport mechanism. By way of example, and not limitation, communication interface (106) may couple to wired media (e.g., a wired network, direct-wired connection, etc.) and/or wireless media (e.g., a wireless network, a wireless connection utilizing acoustic, RF, infrared, or other wireless signalling, etc.).

Communication interface (106) also couples the computer system (100) to one or more input devices (107) (e.g., a keyboard, mouse, pen, voice input device, touch input device, etc.). Additionally, communication interface (100) may couple computer system platform (100) to one or more output devices (e.g., a speaker, printer, etc.).

As shown in FIG. 2, optional graphics controller (108) may be provided and configured to receive first (7) and second (8) image data and respectively output a first and second image data signal to the front (2) and rear (3) screens for displaying the first (5) and second (6) images. The graphics controller (108) may perform graphics processing operations on the graphical image data (7, 8) stored in a frame buffer (109) or another memory (e.g. 102, 104 or 105) of computer system platform (100). Graphical data stored in frame buffer (109) may be accessed, processed, and/or modified by components (e.g., graphics controller (108), processor (101)) of computer system (100) and/or components of other systems/devices.

Accordingly, memory (102), removable storage (104), non-removable storage (105), fame buffer (109), or a combination thereof, may comprise instructions that when executed on the processor (101) implement a method of generating images on the multi-layered display (MLD) (1) as shown in FIG. 8.

As mentioned previously there is a potential problem in using overlapping LCD screens to simultaneously display images as any images on the rear screen overlapped by images on the front screen will be at least partially visible through the front image. As the overlapping images may often be unrelated and not coterminous, the interference between the overlapping images can make either or both images incoherent and difficult for the viewer to comprehend. In the prior art this overlapping problem was addressed by a method of producing a 'white' shadow or silhouette in either the front or rear screens in an overlapped/overlapping portion of one of the images to render that portion more transparent and therefore the other image portion (overlapping/overlapped) more visible. A viewer would thus only see the non-transparent image portions.

However, while this method addressed some of the problem of interference between overlapping images, the existence of the 'white' shadow introduced another problem in that a viewer was sometimes able to see the white shadow if not positioned so that their fixation axis passes through both the white shadow and the corresponding overlapping or overlapped portion. This generally occurred where the viewer's fixation axis was not close to perpendicular to the planes of the screens. Preferred embodiments of the present invention may address this problem as described below.

The computer system (100) in conjunction with the MLD (1) is configured to execute the image generation algorithm to display a target image (14) on the MLD (1) that is constructed from overlapping first (5) and second (6) images, as shown in FIGS. 1b and 7. The first image (5) is displayed on the front screen (2) and therefore overlaps the second image (6) on the rear screen (3).

The target image (14) includes a graphical object (9) displayed on the front LCD screen (2) and is provided in the form of an oval shape in the example of FIG. 1b and a star in the example of FIG. 7. It will be appreciated that the graphical object may be any part, whole or multiple of shapes, text, images and it will be appreciated that the oval and star are provided as examples only.

The target image (14) also includes contextual elements (10) displayed on the rear LCD screen (3) which are provided in the form of an irregular quadrilateral in FIG. 1b and a stripe pattern background in FIG. 7. Again it will be appreciated that the quadrilateral and stripe pattern are provided purely as examples for illustrative purposes only.

A silhouette (11) is also displayed on the rear screen (3) and is overlapped by the graphical object (9) with the peripheral boundaries being coterminous with the overlapping boundaries of the graphical object (9). The silhouette (11) is demarcated by the graphical object (9) on the front screen (2) and bounds a region of the rear screen (3) without any contextual elements (10).

In one embodiment the silhouette (11) displays a pattern, texture, intensity, colour or hue which is not visible or discernable through the graphical object (9) and in the embodiments shown in FIGS. 3-8, the silhouette is generally 'white', i.e. the pixels of the rear screen (3) displaying the silhouette (11) are made substantially transparent.

Alternatively, the silhouette (11) may be a substantial copy of a graphical object (9) with the same colour and pattern etc. However, as described above, displaying a silhouette overlapping/overlapped by a graphical object results in the corresponding composite target image having an alpha value equal to the silhouette and graphical object alpha values multiplied together. In order to compensate, for this problem, the silhouette (11) is displayed with an alpha value equal to the square root of the alpha value of the original graphical object and the graphical object is displayed with an alpha value equal to the original graphical object alpha divided by the silhouette alpha.

The silhouette (11) is also blurred to de-emphasise its boundary and reduce its detectability to a viewer.

As the silhouette (11) is overlapped by the graphical object (9) there will not be any interference with the graphical object (9) by the contextual elements (10) on the rear screen, as would be the case (see FIG. 4) in displaying the contextual elements (10) on the rear screen (3) behind the graphical object (9). However, as described above, a viewer in an 'off-centre' position may be able to see behind the graphical object (9) and see the silhouette (11) which would be distracting, unappealing and detract from the graphical object (9).

The graphical object (9) is thus displayed with a peripheral boundary region (12) that surrounds the graphical object (9) on the front screen (2) and is composed of the contextual elements (10) displayed on the rear screen (3) that are overlapped by the graphical object (9) adjacent the boundary region (12). A viewer off-centre will thus see the peripheral boundary region (12) and not the silhouette (11). As the peripheral boundary region (12) is composed of the contextual elements (10), it will appear to the viewer that the peripheral boundary region (12) forms part of the contextual elements (10) on the rear screen (3) and thus the silhouette (11) will not be discernable by the viewer.

In order for the peripheral boundary region (12) of the graphical object (9) on the first screen (2) to merge unobtrusively with the rear screen (3), the contextual elements (10) and peripheral boundary region (12) on both screens (2, 3) are matched by creating the peripheral boundary region (12) with the contextual elements (10) overlapped by the peripheral boundary region (12).

However, in the embodiment shown in FIGS. 3-7, the striped background contextual element (10) has a uniform appearance across the whole rear screen (3) and as such the contextual elements (10) used to provide the peripheral boundary region (12) need not be matched to a specific location.

The boundaries of the silhouette (11) and peripheral boundary region (12) are also manipulated by feathering. This feathering reduces an observer's awareness of the depth separation between the boundaries and instead presents the appearance of an uninterrupted continuum between the silhouette (11) and contextual elements (10) and between the boundary region (12) and contextual elements (10).

It will be appreciated that other ways of de-emphasising the boundaries of the silhouette (11) and/or peripheral boundary region (12) may be used and by way of example include: feathering, blending, defocusing, dithering, graduating, grading, sequencing, serializing, tapering the pattern, texture, intensity, colour, contrast, brightness, or hue of the boundaries.

Figure 3:
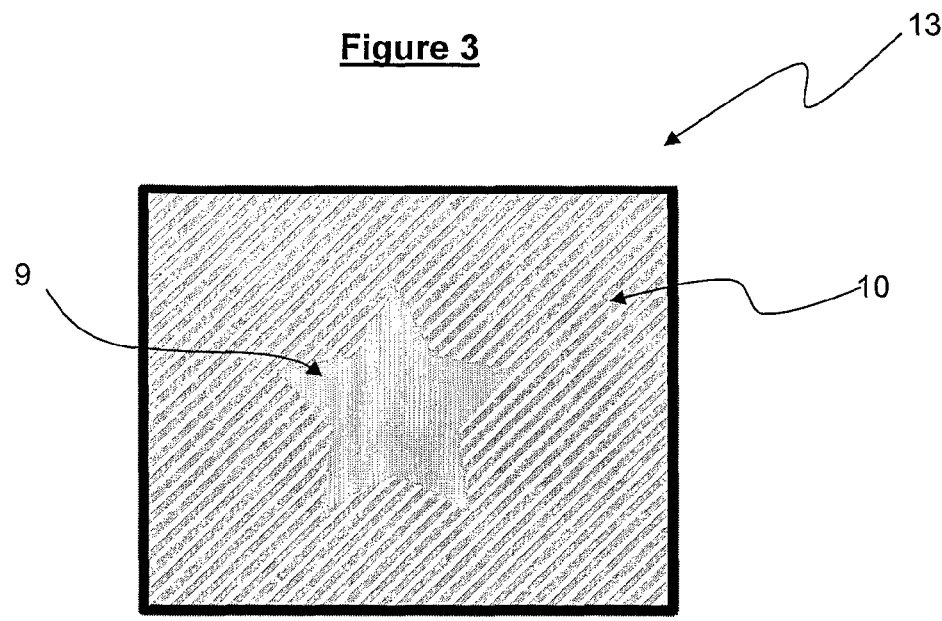
FIG. 3 shows an example of a target image including a graphical object and contextual elements.

FIG. 9 shows a flowchart (200) of one embodiment of a method of generating images for display on the multi-layered display (1) and relates to the progression shown in FIGS. 3-8 of images displayed on the MLD (1). The method is implemented by the computer system (100) which executes the image generation algorithm and generally involves the following steps:

201 Origin image data is accessed which forms an origin image (13) which includes a graphical object (9) and contextual elements (10). This origin image (13) is shown in FIG. 3.

Figure 4:
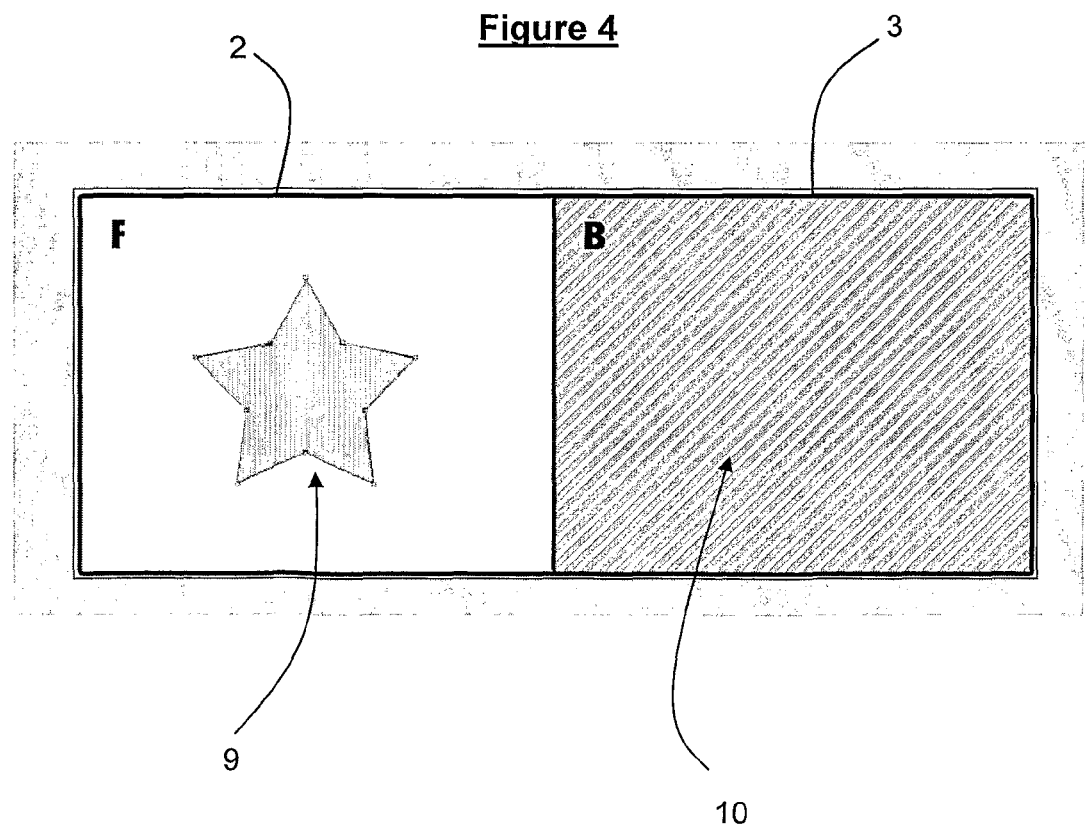
FIG. 4 shows the target image of FIG. 3 with the graphical object and contextual elements displayed on front and rear screens of a multi-layered display according to one preferred embodiment.

202 The origin image data is processed to extract graphical object image data and contextual element image data respectively corresponding to the graphical object (9) and contextual elements (10). This graphical object image data and contextual element image data can be used to respectively display the graphical object (9) and contextual elements (10) on front (2) and rear (3) screens, as shown in FIG. 4.

203 The graphical object image data is processed to generate silhouette data corresponding to the silhouette (11) displayed on the rear screen (3) (see FIG. 5). The silhouette data is then processed to visually de-emphasize the boundary of the silhouette (11) with respect to the contextual elements (10). In the embodiment shown in FIG. 5, the silhouette boundary is manipulated by feathering with the contextual elements (10).

204 The contextual element image data is processed to generate boundary region data corresponding to the peripheral boundary region (12) for display on the front screen (2) (see FIG. 6). The boundary region data is also processed to visually de-emphasize the boundary of the peripheral boundary region with the graphical object (9) and silhouette (11). The entire stripe pattern of the peripheral boundary region is feathered to de-emphasize its boundary with the silhouette (11), contextual elements (10) and graphical object (9).

205 First (7) and second (8) image data is then generated for display as the first (5) and second (6) images (see FIG. 7) on the front (2) and rear (3) screens respectively. The first image (5) includes the graphical object (9) and the peripheral boundary region (12) while the second image (6) includes the contextual elements (10) and silhouette (11).

206 The first (5) and second (6) images forming the target image (14) are then respectively displayed on the front (2) and rear (3) screens as shown in FIG. 8 and FIG. 1b.

FIG. 10 shows a flowchart (210) of another method according to an alternative embodiment where the graphical object (9) and contextual elements (10) are already provided. Therefore steps 201 and 202 are not required.

While reference herein has been made to the graphical object (9) and boundary region (12) overlapping the contextual elements (10) and silhouette (11) it should be appreciated that the present invention also includes the converse arrangement, i.e. the silhouette (11) and contextual elements (10) being displayed on the front screen (2) overlapping the graphical object (9) and boundary region (12) on the rear screen (3).

Aspects of the present invention have been described by way of example only and it should be appreciated that modifications and additions may be made thereto without departing from the scope thereof.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

Aspects of the present invention have been described by way of example only and it should be appreciated that modifications and additions may be made thereto without departing from the scope thereof.

The invention claimed is:

1. A computer-implemented method of processing data, said method comprising:
  generating first data for displaying a first image on a first display screen of a display device, wherein said first image comprises a graphical object; and
  generating second data for displaying a second image on a second display screen of said display device, wherein said first and second display screens overlap, wherein said second image comprises a silhouette corresponding to said graphical object, and wherein said second image further comprises at least one contextual element surrounding said silhouette.

2. The method of claim 1, wherein said generating said first data and said generating said second data further comprises:
  generating said first and second data from origin image data, wherein said origin image data is for displaying an origin image comprising said graphical object and said at least one contextual element.

3. The method of claim 2, wherein said silhouette is operable to be displayed with an alpha value proportional to the square root of an alpha value of a portion of said origin image.

4. The method of claim 2, wherein said silhouette comprises a blurred copy of a portion of said origin image.

5. The method of claim 2, wherein said silhouette is operable to be displayed with an alpha value equal to the square root of an alpha value of a portion of said origin image.

6. The method of claim 2, wherein said graphical object is operable to be displayed with an alpha value proportional to an alpha value of a portion of said origin image divided by an alpha value of said silhouette.

7. The method of claim 1, wherein said silhouette is substantially transparent.

8. The method of claim 1, wherein said first image further comprises a peripheral boundary region surrounding said graphical object, and wherein said peripheral boundary region overlaps a peripheral boundary of said silhouette.

9. The method of claim 8, wherein said peripheral boundary of said silhouette comprises an attribute selected from a group consisting of feathering, blending, defocusing, dithering, graduating, grading, sequencing, serializing, tapering of a pattern, tapering of a texture, tapering of an intensity, tapering of a color, tapering of a contrast, tapering of a brightness, and tapering of a hue.

10. The method of claim 8, wherein said peripheral boundary region comprises an attribute selected from a group consisting of feathering, blending, defocusing, dithering, graduating, grading, sequencing, serializing, tapering of a pattern, tapering of a texture, tapering of an intensity, tapering of a color, tapering of a contrast, tapering of a brightness, and tapering of a hue.

11. A display device comprising:
a first display screen operable to display a first image comprising a graphical object; and
a second display screen operable to display a second image comprising a silhouette corresponding to said graphical object, wherein said second image further comprises at least one contextual element surrounding said silhouette, and wherein said first and second display screens overlap.

12. The display device of claim 11, wherein said generating said first data and said generating said second data further comprises generating said first and second data from origin image data, wherein said origin image data is for displaying an origin image comprising said graphical object and said at least one contextual element.

13. The display device of claim 12, wherein said silhouette is operable to be displayed with an alpha value proportional to the square root of an alpha value of a portion of said origin image.

14. The display device of claim 12, wherein said silhouette comprises a blurred copy of a portion of said origin image.

15. The display device of claim 12, wherein said silhouette is operable to be displayed with an alpha value equal to the square root of an alpha value of a portion of said origin image.

16. The display device of claim 12, wherein said graphical object is operable to be displayed with an alpha value proportional to an alpha value of a portion of said origin image divided by an alpha value of said silhouette.

17. The display device of claim 11, wherein said silhouette is substantially transparent.

18. The display device of claim 11, wherein said first image further comprises a peripheral boundary region surrounding said graphical object, and wherein said peripheral boundary region overlaps a peripheral boundary of said silhouette.

19. The display device of claim 18, wherein said peripheral boundary of said silhouette comprises an attribute selected from a group consisting of feathering, blending, defocusing, dithering, graduating, grading, sequencing, serializing, tapering of a pattern, tapering of a texture, tapering of an intensity, tapering of a color, tapering of a contrast, tapering of a brightness, and tapering of a hue.

20. The display device of claim 18, wherein said peripheral boundary region comprises an attribute selected from a group consisting of feathering, blending, defocusing, dithering, graduating, grading, sequencing, serializing, tapering of a pattern, tapering of a texture, tapering of an intensity, tapering of a color, tapering of a contrast, tapering of a brightness, and tapering of a hue.

21. A system comprising a processor and a memory, wherein said memory comprises instructions that when executed by said system implement a method of processing data, said method comprising:
generating first data for displaying a first image on a first display screen of a display device, wherein said first image comprises a graphical object; and
generating second data for displaying a second image on a second display screen of said display device, wherein said first and second display screens overlap, wherein said second image comprises a silhouette corresponding to said graphical object, and wherein said second image further comprises at least one contextual element surrounding said silhouette, and wherein said silhouette and said graphical object overlap.

* * * * *